March 18, 1941.   J. G. HEASLET   2,235,707
ENGINE STARTER CRANK SUPPORT AND STEERING ASSEMBLY
Filed June 23, 1939
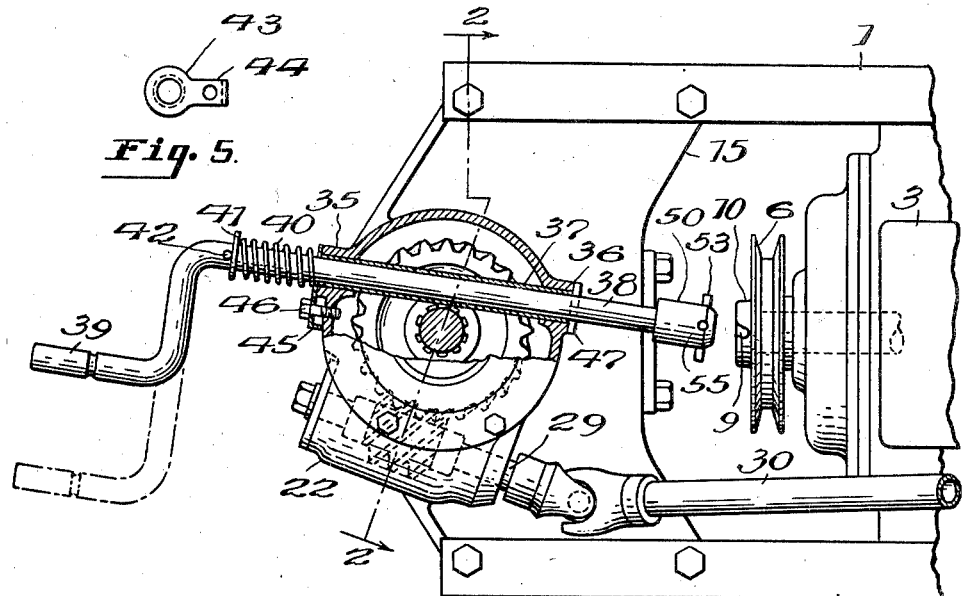
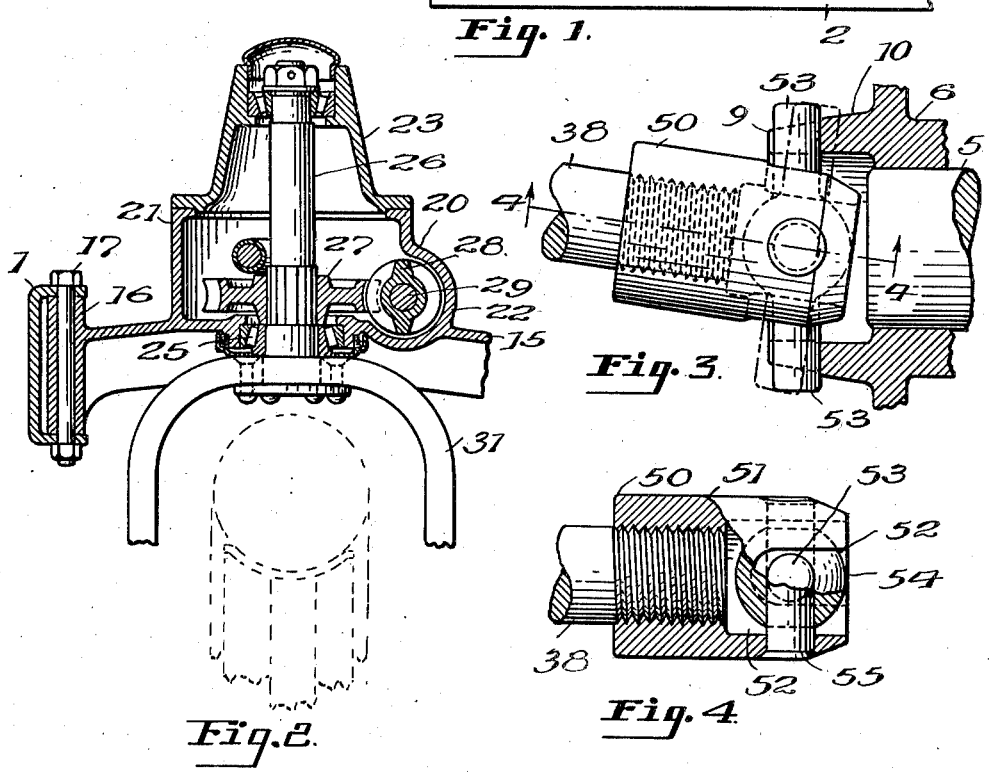
INVENTOR
BY James G. Heaslet
George Douglas Jones
ATTORNEY Patented Mar. 18, 1941

2,235,707

UNITED STATES PATENT OFFICE 2,235,707

ENGINE STARTER CRANK SUPPORT AND STEERING ASSEMBLY

James G. Heaslet, Hudson, Ohio, assignor to The Cleveland Tractor Company, Cleveland, Ohio Application June 23, 1939, Serial No. 280,861

6 Claims. (Cl. 180—79)

This invention relates to an engine starter crank support and steering assembly for use with wheel type tractors wherein the tractor is steered through the medium of a single front wheel.

More particularly, the invention comprises a novel arrangement of parts to obviate the difficulty of mounting an engine starter crank in operative position on tractors having single front steering wheels carried by the tractor frame forward of the power plant.

One object of the invention is to combine the starter crank support with the wheel steering assembly to insure the accurate alignment of the crank operating head or coupling with the fan belt pulley secured to the front end of the engine crank shaft so that rotation of the pulley will start up the engine.

Another object is to mount the starter crank at an angle to the longitudinal axis of the engine shaft to render the offset handle of the crank readily accessible while insuring that the operating head of the shaft will at all times properly mesh with the radial notches formed on the fan belt pulley.

A still further object is to arrange pivoted radial arms on the operating head or coupling of the crank in such a manner that they will solidly mesh with arcuate notches provided on the fan pulley and after the engine starts will be thrown clear thereof.

In the drawing,

Fig. 1 is a top plan, partly in section, of the front end of a tractor frame showing the steering assembly and starter crank support;

Fig. 2 is a vertical cross sectional view taken on line 2—2 of Fig. 1;

Fig. 3 is a detail, partly in cross section showing the operating head of the starter crank in engagement with the engine shaft;

Fig. 4 is a detail, partly in cross section taken on line 4—4 of Fig. 3; and

Fig. 5 is a plan view of the crank holding clip.

Referring to the drawing, numerals 1 and 2 denote the forward portions of the parallel side frame of a wheel type tractor on which is mounted a suitable prime mover 3, such as an internal combustion engine. The front end of the engine crank shaft 5 is fitted with a fan belt pulley 6 having oppositely disposed arcuate notches 9 therein formed in the outwardly extending flange portion 10 of the pulley.

A plate or casting 15, having integral sides 16 is fitted between the sides of the frame members 1 and 2 and secured in place by bolts 17. This construction forms a rigid platform extending slightly in advance of the frame members for the support of steering mechanism 20. Specifically, the plate or casting 15 is formed with an upwardly extending cylindrical casing 21 and offset tubular portion 22, with a tapered cap 23 affixed to the upper end of the cylinder 21.

A roller bearing 25 is mounted beneath the center point of the cylinder 21 for supporting a vertical steering spindle or column 26 which is rotated by pinion 27 meshing with worm 28 carried on shaft 29 in the offset tubular portion 22. The shaft 29 receives movement from a suitable steering rod 30 although the details of this construction form no part of the present invention. Steering spindle or column 26 is bearinged at its upper end in the cap 23 and is rigidly secured at its lower end to a fork 31, between the arms of which is mounted the forward supporting and steering wheel of the tractor.

Referring to the cylindrical casing 21 it will be observed that it is formed with aligned outwardly flanged openings 35 and 36 to one side of its vertical axis with a sleeve or bearing tube 37 carried in the flanged openings lying to the side of and out of contact with the spindle or column 26. Straight portion 38 of the crank arm is encased within the sleeve 37 and extends beyond both ends thereof, while the forward portion thereof is bent to form a handle 39 and the opposite end thereof is provided with an operating head or coupling member 50. A coil spring 40 surrounds the crank between the opening 35 and the handle 39, being retained at one end by washer 41 and pin 42 and washer plate 43, and bearing against an offset arm 44 integral therewith and bent end 45 at the other end. As shown in Figs. 1 and 5, the washer plate 43 rests against the end of the sleeve 37 and the flat side of the flanged opening 35, being retained in position by bolt 46. A stop pin 47 passes through the crank 38 to limit the outward movement of the crank by the spring 40.

As shown in detail in Figs. 3 and 4, the operating head or coupling between the end of the crank arm 38 and the pulley 6 comprises a sleeve 51 screw threaded on the arm, having a socket 52 formed therein with opposite cut out sections or slots 52 to accommoate the outwardly extending arms 53 attached to or integrally formed on a ball 54 pivoted within the socket 53 on pivot pin 55.

In operation, when it is desired to start the power plant the fuel and ignition are adjusted, whereupon the operator grasps the handle 39 and presses the coupling device arms 53 into engagement with the arcuate slots 9 in the pulley flange after which the crank is rotated to turn the engine over. As soon as an explosion occurs the engine shaft kicks over the opposite direction and the arcuate slots throw out the arms 53.

It will be observed that by arranging the starter crank arm in diagonal position that the operator has easy access thereto without interference with the centrally located front steering wheel regardless of its position and further the sleeve 37 keeps the starter arm in exact alignment so that the pivoted coupling arms 53 will immediately contact with the slots 9. By reason of the pivotal action of the arms 53 they have no difficulty in meshing with the slots notwithstanding the angle on which the starter arm is mounted.

What I claim is:

1. In a power driven tractor of the type having parallel side frames and a front supporting wheel, a platform secured to the frame directly above said front wheel, a vertical steering column for said wheel, said column extending through said platform, gearing means for turning said column, a casing on said platform enclosing the upper part of said column and said gearing means, anti-friction bearings for said steering column mounted below the said platform and in the upper part of said casing, a driving engine for said tractor mounted rearwardly of said platform, and a starter crank associated with said engine, said crank being supported by and extending through the walls of said casing.

2. A combined tractor steering and engine starter mechanism as set forth in claim 1, wherein the starter crank is enclosed within a bearing tube extending through the walls of the steering column and gearing casing.

3. A combined tractor steering and engine starter mechanism as set forth in claim 1, wherein the starter crank arm is mounted within a tubular bearing, said bearing passing through said casing at an oblique angle to the vertical axis of the steering column and to the longitudinal axis of the engine crank shaft.

4. A combined tractor steering and engine starter mechanism as set forth in claim 1, wherein the vertical casing enclosing the steering column is integral with the platform and the crank supporting openings in the casing are provided with external integral flanges, a continuous tubular bearing mounted in the said flanged openings and the starting crank supported in the said tubular bearing.

5. In a power driven tractor, parallel side frames, a power plant having a crank shaft carried between said side frames at a distance from the front ends thereof, a platform secured to the side frames at the front ends thereon, a vertical steering shaft enclosed in a casing on said platform and depending therefrom, gearing in said casing for turning said steering shaft, and a starter crank shaft supported within a bearing tube, the ends of said tube passing through and secured to the wall of said casing, one end of said starter shaft having detachable means for engagement with said power plant crank shaft.

6. In a tractor of the type having parallel side frames and a front ground engaging steering wheel, a transverse platform secured between the front ends of said side frames, a vertically mounted steering column carried by said platform, gearing associated with said column for rotating the same, a cylindrical casing on said platform surrounding said column and gearing, an antifriction bearing secured beneath said platform and encompassing the lower end of said steering column, a wheel fork attached to the lower end of said column and in contact with said bearing, an internal combustion engine mounted on said tractor side frames in spaced relation to said platform, a pulley driven by the engine and lying in the space between the engine and the said plaform, radial end slots in said pulley, and a manually operated engine starter crank, said crank being horizontally mounted through the walls of said casing and lying to one side of said steering column and at an angle to the longitudinal axis of said engine pulley, a detachable coupling secured to the inner end of said starter crank for engagement with the radial end slots in said pulley, said coupling including an end socket having slotted side walls with a radially extending arm pivoted therein.

JAMES G. HEASLET.